Aug. 14, 1928.

C. S. WRIGHT ET AL 1,680,715

COORDINATED BRAKE AND CLUTCH MECHANISM

Filed April 5, 1927   2 Sheets-Sheet 1

INVENTORS.
C. S. Wright
BY J. R. Mahan
F. N. Barber
ATTORNEY

Aug. 14, 1928.  1,680,715
C. S. WRIGHT ET AL
COORDINATED BRAKE AND CLUTCH MECHANISM
Filed April 5, 1927   2 Sheets-Sheet 2

INVENTORS
C.S. Wright
BY J.R. Mahan
F.N. Barber
ATTORNEY

Patented Aug. 14, 1928.

1,680,715

UNITED STATES PATENT OFFICE.

CLYDE S. WRIGHT AND JOSEPH R. MAHAN, OF TOLEDO, OHIO, ASSIGNORS TO THE NATIONAL SUPPLY COMPANY, OF TOLEDO, OHIO, A CORPORATION OF OHIO.

COORDINATED BRAKE AND CLUTCH MECHANISM.

Application filed April 5, 1927. Serial No. 181,055.

Our invention relates to coordinated braking and clutching apparatus designed particularly for sand reels, but adapted to be used in other types of apparatus.

One object of this invention is to provide means whereby either the brake may be set and the clutch released, or the clutch may be interlocked with its companion member and the brake released, the structure being such that the opening movement of the clutch may stop without affecting the braking operation. In the apparatus shown the movement of the clutch actuating member is very small, and it is quite important that the brake-setting means shall have further possible movement after the clutch has been opened. This gives more freedom in the design of the apparatus and allows the brake operating devices to compensate for wear of the brake linings and drums. Other objects appear hereinafter.

Figure 1:
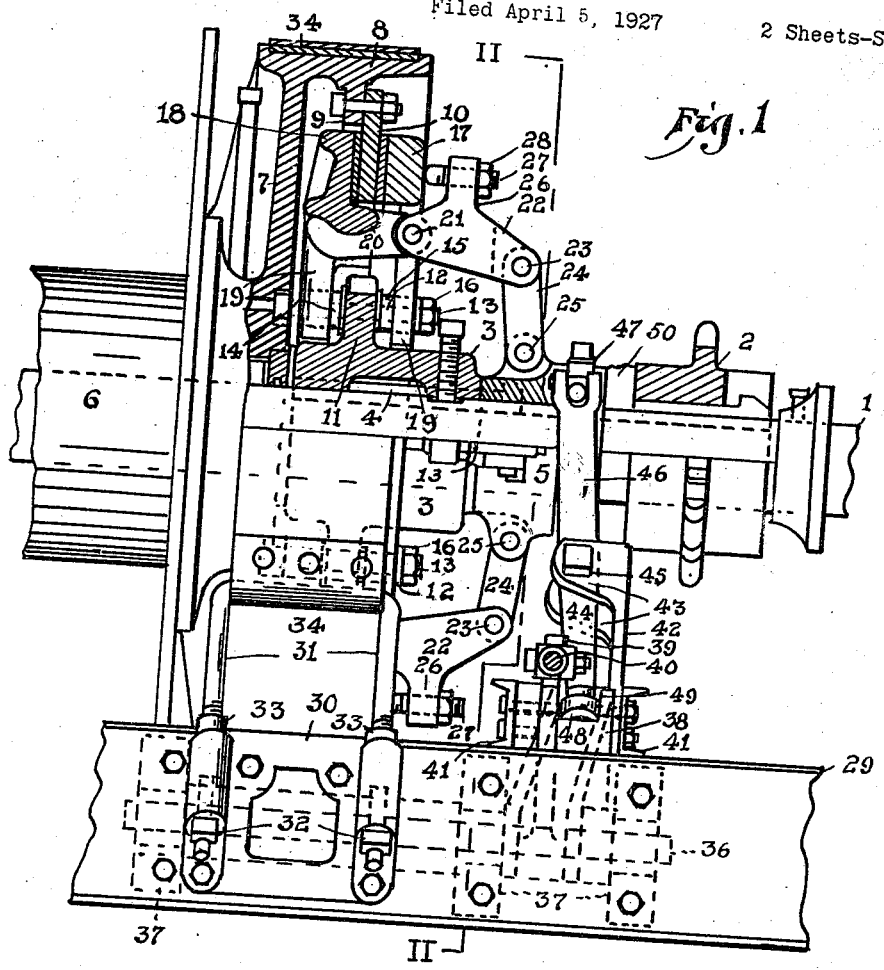
Figure 2:
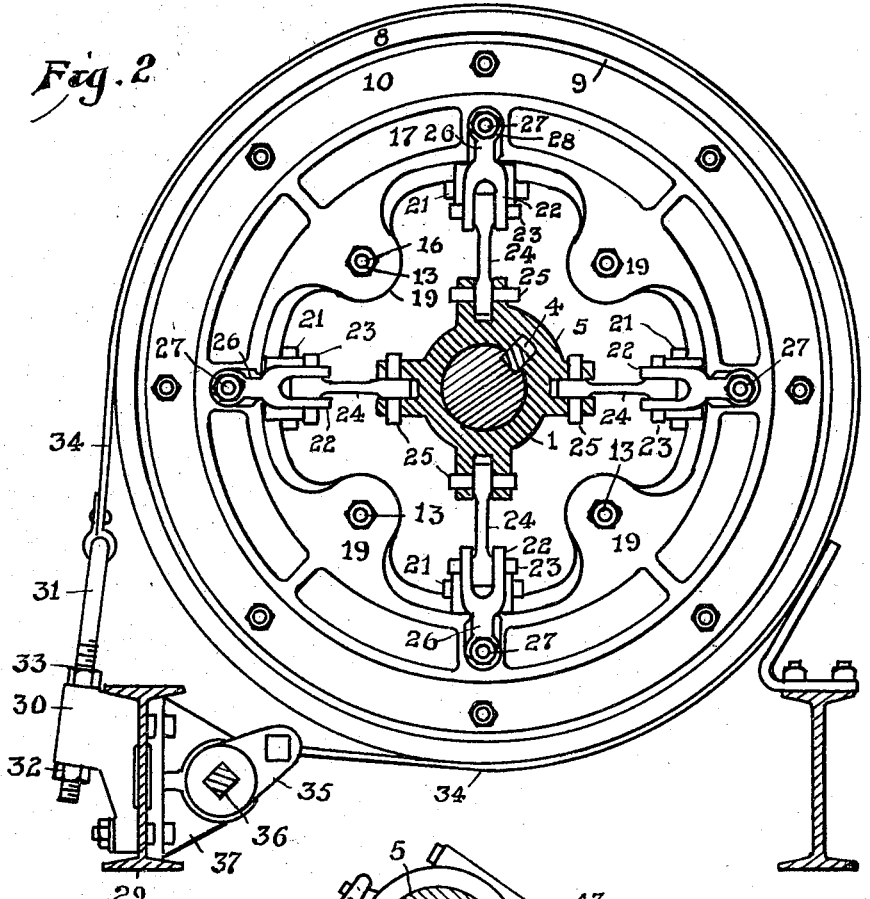
Figure 3:
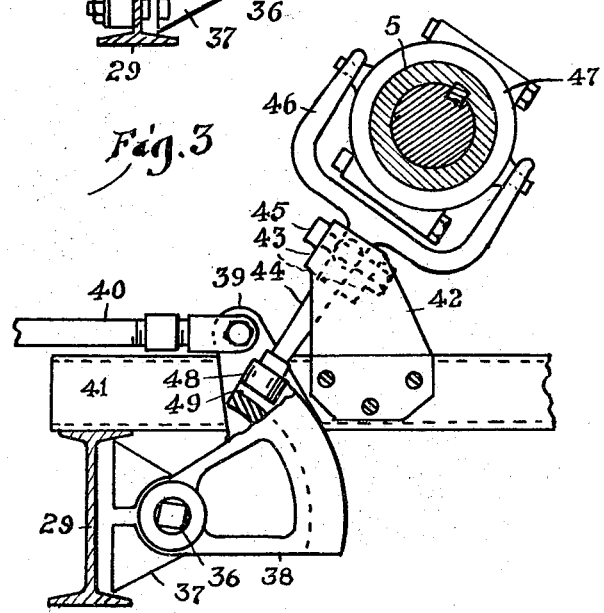

Referring to the accompanying drawing, Fig. 1 is a side view, partly in vertical section, of a clutch and brake mechanism containing our invention, parts being broken away at both ends; Fig. 2, a section on the line II—II on Fig. 1; Fig. 3, a fragmentary view showing the means for operating the clutch-actuating sleeve on the main shaft, parts being in section; and Fig. 4, an edge view of the cam 38.

On the drawing, 1 designates a shaft to which is keyed the driving sprocket-wheel 1, A hub or collar 3 is keyed to the shaft 2 by the key 4. The clutch-operating collar or sleeve 5 is on the said shaft and has a small sliding movement longitudinally of the shaft, the key 4 acting as a spline for causing the sleeve to rotate with the shaft and for permitting its travel longitudinally thereof.

6 is a reel or drum loose on the shaft 1. It is on the opposite side of the hub 3 from the sleeve 5 and has attached thereto the brake drum having the web 7 at the left of the hub 3 and the rim 8 which surrounds or overhangs the hub 3. The rim has the central internal rib or flange 9 to which is bolted the friction or brake ring 10 arranged at right angles to the shaft 1. The hub 3 has the central rib or flange 11 in radial alinement with the ring 10. The flange 11 carries a series of pins 12 extending laterally therefrom at each side. Each pin comprises a bolt 13 having a head 14 at one side of the flange 11 and a collar 15 thereon at the other side of the flange 11, a nut 16 on the bolt engaging the outer end of the collar 15, to clamp the pin to the sides of the flange 11.

On one side of the ring 10 is the clutch ring 17 and on the opposite side thereof is the clutch ring 18, arranged to engage opposite sides of the friction ring 10. The rings 17 and 18 are provided with radial inwardly-extending lugs or ears 19 through which the ends of the pins 12 extend so that the rings are caused to rotate with the hub 3 and the shaft 1. The lugs 19 have a sliding fit with the pins 12 so that the rings may move longitudinally of the shaft 1 in gripping and releasing the brake-ring 10. The ring 18 has a number of arms 20 (only one shown) which extend beneath the ring 17. Each arm 20 has pivoted thereto one end of the approximately horizontal lever 22, the pivot being marked 21. The other end of each lever has the pivot pin 23 which carries the link 24 connected to the collar 5 by the pin 25. Each lever 22 has an outwardly extending arm 26 which carries a screw 27 arranged to engage the outer lateral face of the ring 17, the screw being locked by the jam nut 28.

29 is an I-beam lying below and at one side of the brake-drum. The I-beam supports the metal block 30 in which the threaded legs of the U-bolt 31 are adjustably secured by the nuts 32 and 33. The brake-band 34 has one end connected to the bolt 31 and extends around the brake-drum, its remaining end being connected to the arm 35 carried by one end of the shaft 36, which has bearings in the blocks 37 carried by the I-beam 29. The remaining end of the shaft 36 carries the cam 38 provided with the ear or lug 39 to which the cam-operating rod 40 is pivotally attached.

Figure 4:
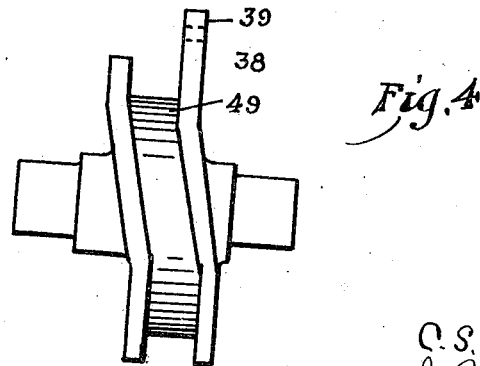

Two channel bars 41 are seated on the I-beam beneath the shaft 1, one bar at each side of a portion of the cam 38. A bracket 42 has its lower end between the bars 41 to which it is bolted. The upper end of the bracket is provided with the ears 43 between which the central portion of the lever 44 is held on the pivot 45 carried by the said ears. The upper end of the lever has the forking arms 46 which are pivoted to the usual clutch-shifting ring 47 carried by the collar 5. The lower end of the lever 44 carries a roller 48 which rides in a cam-groove 49 on the periphery of the cam. Fig. 4 shows the cam 38 as it would appear to an observer looking toward the left at the mechanism as shown in Fig. 3. On Fig. 1 the groove 49 lies on the edge of the cam farthest from the observer. The groove 49 runs diagonally downwardly and away from the observer, looking at Fig. 3, for a certain distance and then continues straight downwardly or in a direction at right angles with the shaft 36 or axial center of the cam. On Fig. 1 it is seen that the upper end of the lever 44 or fork 46 has only the space 50 to move to the right to open the clutch fully. The length of the diagonal part of the groove 49 is such as to cause the space 50 to be closed. At the time the rod 40 has operated the cam so as to bring the roller 48 to the lower end of the diagonal part of the groove, the brake-band 34 has been pretty tightly set, but it may be that the rod 40 must be pulled still farther to set the brake tightly. This is permitted by providing the cam with the said lower portion of the groove, in which the roller may travel without any effect on the lever 44. Thus the pulling of the rod 40 operates the arm 35 to set the brake and to move the cam 38 so as to cause the lever 44 to open the clutch without in any manner limiting the operation of the brake. In Fig. 1 the clutch is closed, as the collar 5 is at its left limit at which it has caused the links 24 to push the outer ends of the levers 22 outwardly, thereby causing the brake rings 17 and 18 to be drawn against the friction ring 10 by the obvious action of the screws 27, the pivots 21 and the arms 20.

When the rod 40 as shown in Fig. 3 is pushed to the left, the shaft 36 is rocked so as to release the brake and to close the clutch.

We claim—

1. The combination of a shaft, a brake drum loose thereon, a clutch mechanism driven by the shaft and adapted to be connected to the brake drum and disconnected therefrom, a lever connected to the said mechanism for operating the same, a braking element for the brake drum, a shaft, means for operating the same, means for operatively connecting the shaft to the braking element, and a rotatable member connected to the latter shaft and having a cam groove to receive the said lever, the said groove being shaped so as to cause the lever to open the clutch when the second shaft is operated so as to set the brake, and to close the clutch when the shaft is operated so as to release the brake.

2. The combination of a shaft, a brake drum loose thereon, a clutch mechanism driven by the shaft and adapted to be connected to the brake drum and disconnected therefrom, a lever connected to the said mechanism for operating the same, a braking element for the brake drum, a shaft, means for operating the same, means for operatively connecting the shaft to the braking element, and a member connected to the latter shaft and having a cam groove to receive the said lever, the said groove being shaped so as to cause the lever to open the clutch when the second shaft is operated so as to set the brake, and to close the clutch when the shaft is operated so as to release the brake, the said groove being shaped so as to cease operating the lever after the lever has moved a predetermined distance in the opening operation of the clutch.

3. The combination of a shaft, a brake drum loose thereon, a clutch mechanism driven by the shaft and adapted to be connected to the brake drum and disconnected therefrom, a lever connected to the said mechanism for operating the same, a braking element for the brake drum, a shaft, means for operating the same, means for operatively connecting the shaft to the braking element, and a member connected to the latter shaft and having a groove to receive the lever, the groove having a portion arranged diagonally of the second shaft communicating with a second portion arranged at right angles to the latter shaft, whereby the latter shaft operates both the braking element and the clutch-operating lever while the lever is in the diagonal portion of the groove, but does not operate the lever when it is in the other portion thereof.

4. The combination of a shaft, a brake drum, a clutch mechanism adapted to be connected to the brake drum and disconnected therefrom, a lever connected to the said mechanism for operating the same, a braking element for the brake drum, a shaft, means for operating the same, means for operatively connecting the shaft to the braking element, and a member connected to the latter shaft and having a cam groove to receive the said lever, the said groove being shaped so as to cause the lever to open the clutch when the second shaft is operated so as to set the brake, and to close the clutch when the shaft is operated so as to release the brake, the said groove being shaped so as to cease operating the lever after the lever has moved a pre-determined distance in the opening operation of the clutch.

In testimony whereof, we hereunto affix our signatures.

CLYDE S. WRIGHT.
JOSEPH R. MAHAN.